(12) United States Patent
Jang et al.

(10) Patent No.: US 8,216,708 B2
(45) Date of Patent: Jul. 10, 2012

(54) SECONDARY BATTERY HAVING ELECTRODE TERMINAL WHOSE POSITION IS ADJUSTABLE AND IMPROVED SAFETY

(75) Inventors: Jun Hwan Jang, Seoul (KR); Hyung Ku Yun, Daejon (KR); Byungjin Choi, Daejeon (KR); Hyang Mok Lee, Seoul (KR)

(73) Assignee: LG Chem, Ltd. (KR)

( * ) Notice: Subject to any disclaimer, the term of this patent is extended or adjusted under 35 U.S.C. 154(b) by 1098 days.

(21) Appl. No.: 11/777,659

(22) Filed: Jul. 13, 2007

(65) Prior Publication Data

US 2008/0070067 A1 Mar. 20, 2008

(30) Foreign Application Priority Data

Sep. 18, 2006 (KR) ........................ 10-2006-0089907

(51) Int. Cl.
*H01M 2/00* (2006.01)
(52) U.S. Cl. ........... 429/65; 429/162; 429/170; 429/178
(58) Field of Classification Search .................. 429/162, 429/65, 170, 178
See application file for complete search history.

(56) References Cited

U.S. PATENT DOCUMENTS

| 6,653,018 | B2 * | 11/2003 | Takahashi et al. | 429/185 |
|---|---|---|---|---|
| 2005/0164080 | A1 * | 7/2005 | Kozu et al. | 429/176 |
| 2006/0269831 | A1 * | 11/2006 | Kim | 429/62 |

FOREIGN PATENT DOCUMENTS

| KR | 10-2001-0082058 | 8/2001 |
|---|---|---|
| KR | 10-2001-0082059 | 8/2001 |
| KR | 10-2001-0082060 | 8/2001 |

* cited by examiner

*Primary Examiner* — Jane Rhee
(74) *Attorney, Agent, or Firm* — Lerner, David, Littenberg, Krumholz & Mentlik, LLP

(57) ABSTRACT

Disclosed herein is a secondary battery including a safety connection member constructed in a structure in which a horizontal connection terminal (a), which is connected to an electrode lead of a battery, is connected to one end of a safety element, and a vertical connection terminal (b) is connected to the other end of the safety element. The position of the electrode lead of the battery is easily adjusted due to the safety connection member. Also, the high-temperature safety of the battery is improved due to the safety element.

12 Claims, 7 Drawing Sheets

300

SECONDARY BATTERY HAVING ELECTRODE TERMINAL WHOSE POSITION IS ADJUSTABLE AND IMPROVED SAFETY

FIELD OF THE INVENTION

The present invention relates to a secondary battery having an electrode terminal whose position is adjustable and improved safety, and, more particularly, to a secondary battery constructed in a structure in which a safety connection member, having a horizontal connection terminal connected to one end of a safety element and a vertical connection terminal connected to the other end of the safety element, is connected to an electrode terminal of a battery cell, whereby the position of a electrode lead of the battery is easily adjusted by the safety connection member.

BACKGROUND OF THE INVENTION

As mobile devices have been increasingly developed, and the demand of such mobile devices has increased, the demand for batteries has also sharply increased as an energy source for the mobile devices. Also, much research on batteries satisfying various needs has been carried out.

In terms of the shape of batteries, the demand of prismatic secondary batteries or pouch-shaped secondary batteries, which are thin enough to be applied to products, such as mobile phones, is very high. In terms of the material for batteries, the demand of lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are successively stacked one on another while separators are disposed respectively between the cathodes and the anodes, or a stacking/folding type structure in which pluralities of cathodes and anodes having a predetermined size are successively stacked one on another while separators are disposed respective between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view illustrating the general structure of a conventional pouch-shaped secondary battery 10.

Referring to FIG. 1, the pouch-shaped secondary battery 10 includes an electrode assembly 30, pluralities of electrode taps 40 and 50 extending from the electrode assembly 30, electrode leads 60 and 70 welded to the electrode taps 40 and 50, respectively, and a battery case 20 for receiving the electrode assembly 30.

The electrode assembly 30 is a power generating element comprising cathodes and anodes successively stacked one on another while separators are disposed respectively between the cathodes and the anodes. The electrode assembly 30 is constructed in a stacking structure or a stacking/folding structure. The electrode taps 40 and 50 extend from corresponding electrode plates of the electrode assembly 30. The electrode leads 60 and 70 are electrically connected to the electrode taps 40 and 50 extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 is partially attached insulative film 80 for improving sealability between the battery case 20 and the electrode leads 60 and 70 and, at the same time, for accomplishing electrical insulation between the battery case 20 and the electrode leads 60 and 70.

The battery case 20 is made of an aluminum laminate sheet. The battery case 20 has a space defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode taps 40 and the plurality of anode taps 50 can be coupled to the electrode leads 60 and 70, respectively.

FIG. 2 is an enlarged view, in part, illustrating the inner upper end of the battery case of the secondary battery shown in FIG. 1, in which the cathode taps are coupled to each other in a concentrated state and connected to the cathode lead, and FIG. 3 is a front see-through view illustrating the secondary battery of FIG. 1 in an assembled state.

Referring to these drawings, the plurality of cathode taps 40, which extend from cathode collectors 41 of the electrode assembly 30, are connected to one end of the cathode lead 60, for example, in the form of a welded bunch constituted by integrally combining the cathode taps 40 with each other by welding. The cathode lead 60 is sealed by the battery case 20 while the other end 61 of the cathode lead 60 is exposed to the outside of the battery case 20. Since the plurality of cathode taps 40 are integrally combined with each other to constitute the welded bunch, the inner upper end of the battery case 20 is spaced a predetermined distance from the upper end surface of the electrode assembly 30, and the cathode taps 40 combined in the form of the welded bunch are bent approximately in the shape of V.

As applications to which a secondary battery is applied are diversified, there is necessity for a battery cell constructed in a structure in which the positions of the electrode terminals are adjusted depending upon devices to be used. For the conventional secondary battery, however, the positions of the electrode taps extending from the electrode plates constituting the electrode assembly must be changed to change the positions of the electrode terminals, which is restricted depending upon the specifications of the devices to be used.

When a secondary battery is used as a unit cell of a battery module, on the other hand, the safety of the battery module must be more carefully considered. Generally, a lithium secondary battery suffers relatively great volumetric change while lithium ions are absorbed to or discharged from an anode. Specifically, the lithium secondary battery repeatedly expands and contracts during the repetitive charge and discharge of the lithium secondary battery. At this time, the internal resistance of the lithium secondary battery increases. As a result, the efficiency of the lithium secondary battery is greatly reduced. Also, a battery case may be separated due to excessive expansion of the lithium secondary battery. As a result, an electrolyte may leak, and therefore, the lithium secondary battery may catch fire or explode. Furthermore, the fire or explosion of some battery cells results in consecutive fire or explosion of the remaining battery cells, whereby a serious situation may be caused.

Consequently, there is high necessity for a novel secondary battery constructed in a structure in which the positions of the electrode terminals are easily adjusted and having improved safety.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a specifically-shaped safety connection member, including a PTC element, a bimetal, and a thermal fuse, is mounted to an electrode terminal of a battery cell, it is possible to easily adjust the position of the corresponding electrode terminal of the battery cell and to provide a secondary battery having considerably-improved high-temperature safety. The present invention has been completed based on these findings.

In accordance with one aspect of the present invention, the above and other objects can be accomplished by the provision of a secondary battery constructed in a structure in which a member ("safety connection member"), having a horizontal connection terminal (a) connected to one end of a safety element and a vertical connection terminal (b) connected to the other end of the safety element, is connected to at least one electrode terminal of a battery cell having an electrode assembly of a cathode/separator/anode structure disposed in a battery case in a sealed state, whereby an external input and output terminal of the battery cell is variably formed due to the safety connection member.

Specifically, the horizontal connection terminal (a) of the safety connection member is connected to a cathode terminal or an anode terminal of the secondary battery, and the vertical connection terminal (b) of safety connection member is electrically connected to an external circuit. Consequently, it is possible to shift the position of the corresponding electrode terminal to the right or to the left by the horizontal length of the safety connection member.

The safety element of the safety connection member is not particularly restricted so long as the safety of the secondary battery is secured by the provision of the safety element. Preferably, the safety element of the safety connection member is at least one selected from a group consisting of a positive temperature coefficient (PTC) element, a bimetal, and a thermal fuse. More preferably, the safety element of the safety connection member is a thermal fuse. When the secondary battery is overcharged or overdischarged, the internal resistance of the secondary battery increases with the result that the efficiency of the battery is greatly reduced. Furthermore, the battery cell may catch fire or explode due to heat generated during the charge and discharge of the secondary battery. With the structure in which the safety connection member, including the thermal fuse, is mounted to the corresponding electrode terminal of the battery cell according to a preferred embodiment of the present invention, the thermal fuse is melted or cut by heat generated when electric current exceeding a rated capacity flows in the battery cell, whereby the high-temperature safety of the battery cell is greatly improved.

One of the connection terminals of the safety connection member electrically connects the safety element according to the present invention and a corresponding electrode terminal of the battery cell. For this reason, the connection terminal of the safety connection member may be a conductive metal plate. Preferably, the connection terminal of the safety connection member is a metal plate having the same material as the corresponding electrode terminal of the battery cell so as to minimize the generation of heat due to the electrical resistance at the joint between the connection terminal and the corresponding electrode terminal.

One end of the safety connection member is connected to a corresponding electrode terminal of the battery cell, and the other end of the safety connection member is connected to an external circuit. In order to easily accomplish the connection between the safety connection member and the external circuit, the safety connection member may be constructed in a structure in which the connection terminals are connected to opposite ends of the safety element, and a metal plate is coupled to one of the connection terminals such that the metal plate is perpendicular to the corresponding connection terminal. The perpendicularly connected metal plate serves as an external input and output terminal of the battery cell.

The battery case may be a secondary battery case having a small thickness and relatively large width and length such that the total size of the battery case is minimized when a plurality of battery cases are stacked one on another to construct a battery module. In a preferred embodiment, the battery case is constructed in a structure in which an electrode assembly is mounted in the battery case, and electrode terminals extends from the upper end and/or the lower end of the battery case, and is made of a laminate sheet including a resin layer and a metal layer. Specifically, the battery case is a pouch-shaped case made of an aluminum laminate sheet and constructed in a structure in which the electrode assembly is mounted in the battery case.

The electrode assembly is not particularly restricted so long as the electrode assembly is constructed in a structure in which pluralities of electrode taps are connected to constitute cathodes and anodes. Preferably, the electrode assembly is constructed in a stacking structure or in a stacking/folding structure. The details of the stacking/folding type electrode assembly are disclosed in Korean Unexamined Patent Publication No. 2001-0082058, No. 2001-0082059, and No. 2001-0082060, which have been filed in the name of the applicant of the present patent application. The disclosures of the above-mentioned patent publications are hereby incorporated by reference as if fully set forth herein.

The electrode assembly is a power generating element constructed in a structure in which cathodes and anodes are alternately stacked one on another while separators are disposed respectively between the cathodes and the anodes. The electrode assembly is constructed in a stacking structure or in a stacking/folding structure. Specifically, pluralities of electrode taps extending from the electrode assembly are electrically connected to corresponding electrode leads, and the electrode leads are partially exposed to the outside of the battery case to form electrode terminals of the battery cell. Preferably, a plurality of cathode taps are connected to one of the electrode leads, and a plurality of anode taps are connected to the other electrode lead.

The safety connection member may be connected to at least one of the electrode terminals of the battery cell. Preferably, the safety connection member is connected to an electrode terminal of the battery cell. More preferably, the safety connection member is connected to a cathode terminal of the battery cell.

The shape of the battery cell is not particularly restricted. For example, the battery cell is constructed in a structure in which the electrode terminals of the battery cell are arranged either in the same direction or in the different directions. The safety connection member is mounted to the battery cell irrespective of the positions of the electrode terminals of the battery cell.

In a preferred embodiment of the present invention, the battery cell is a battery cell having a pouch-shaped battery case, and the battery cell is constructed as follows:

(i) the horizontal connection terminal (a) of the safety connection member is connected to an electrode lead (A) of the battery cell such that the vertical connection terminal (b) of the safety connection member is directed toward the lower part of the battery cell, (ii) the electrode lead (A) of the battery cell is bent downward such that the safety connection member is rotated 180 degrees, (iii) sealing parts of the pouch-shaped battery case are bent perpendicularly to the main surface of the battery case such that the sealing parts is brought into tight contact with the outer surface of an electrode assembly receiving part of the battery cell, and (iv) the vertical connection terminal (b) of the safety connection member is bent upward vertically to form the external input and output terminal.

The present invention is applicable to various kinds of batteries. For example, the present invention is preferably applicable to a lithium secondary battery manufactured by impregnating the electrode assembly with an electrolyte containing lithium.

In accordance with another aspect of the present invention, there is provided a safety connection member mounted to the secondary battery.

The safety connection member is connected to at least one electrode terminal of a battery cell having an electrode assembly of a cathode/separator/anode structure disposed in a battery case in a sealed state to form an external input and output terminal of the battery cell. The safety connection member is constructed in a structure in which a horizontal connection terminal (a) is connected to one end of a safety element, and a vertical connection terminal (b) is connected to the other end of the safety element.

It is possible to adjust the distance between the horizontal connection terminal (a) and the vertical connection terminal (b) and to modify the shapes of the horizontal connection terminal (a) and the vertical connection terminal (b), thereby shifting at least one electrode terminal of the battery cell from its original position to a desired position using the safety connection member according to the present invention.

Also, the secondary battery is preferably used to manufacture a medium- or large-sized battery module or battery pack having large capacity. The scope of the large capacity is not particularly restricted.

Consequently, the present invention provides a medium- or large-sized battery module including a plurality of secondary batteries as unit cells and a medium- or large-sized battery pack, having high output and large capacity, which includes at least one medium- or large-sized battery module.

In the a medium- or large-sized battery pack according to the present invention, safety elements are attached to some or all of the unit cells constituting the battery pack, whereby the safety of the entire battery pack is greatly improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
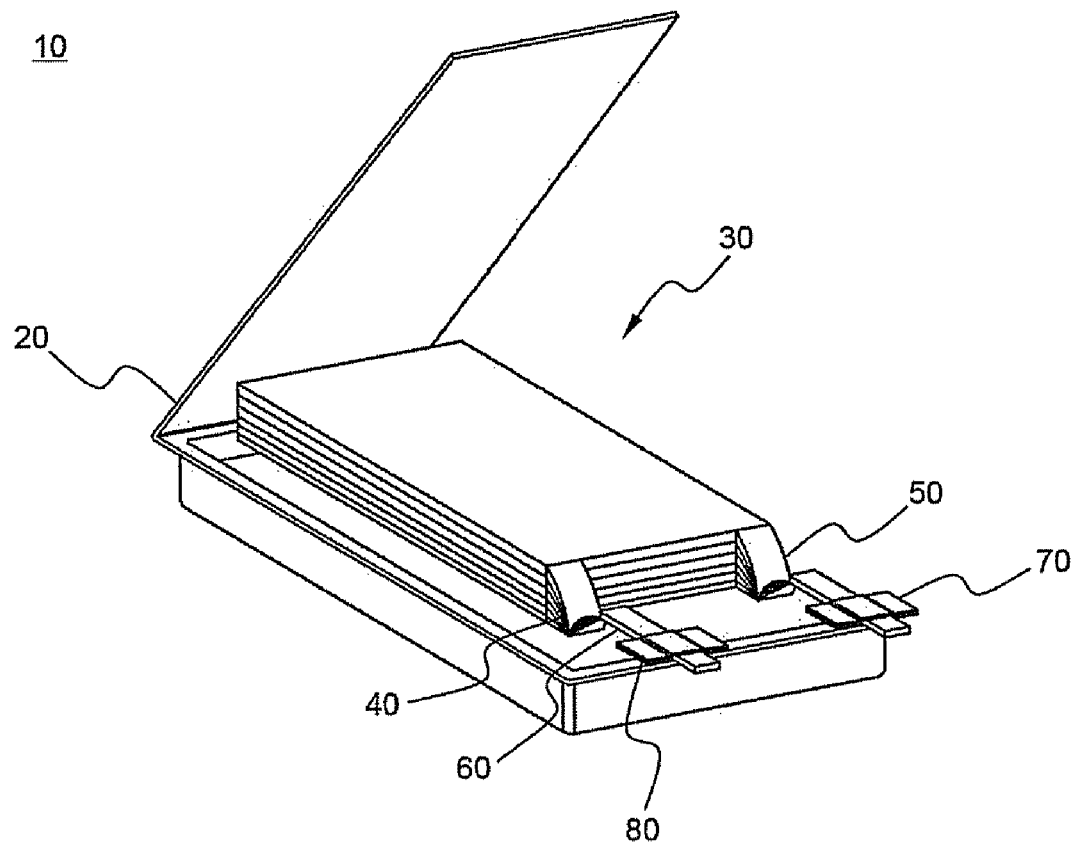
FIG. 1 is an exploded perspective view illustrating the general structure of a conventional pouch-shaped secondary battery.
Figure 2:
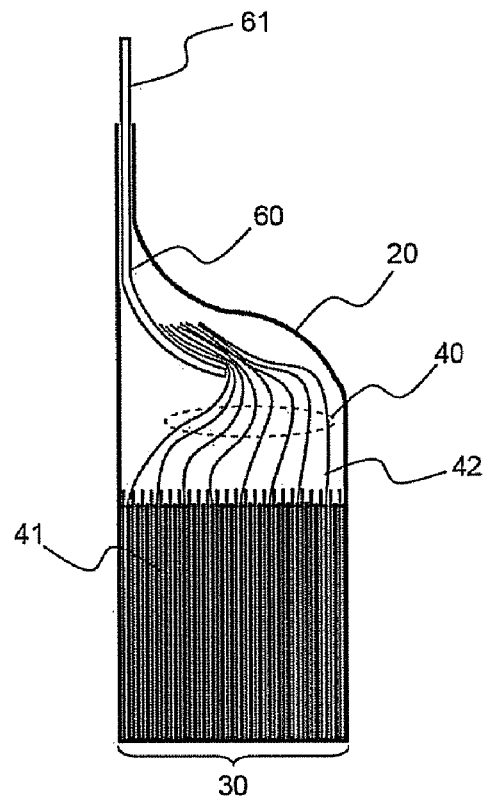
FIG. 2 is an enlarged view, in part, illustrating the inner upper end of a battery case of the secondary battery shown in FIG. 1, in which cathode taps are coupled to each other in a concentrated state and connected to a cathode lead.
Figure 3:
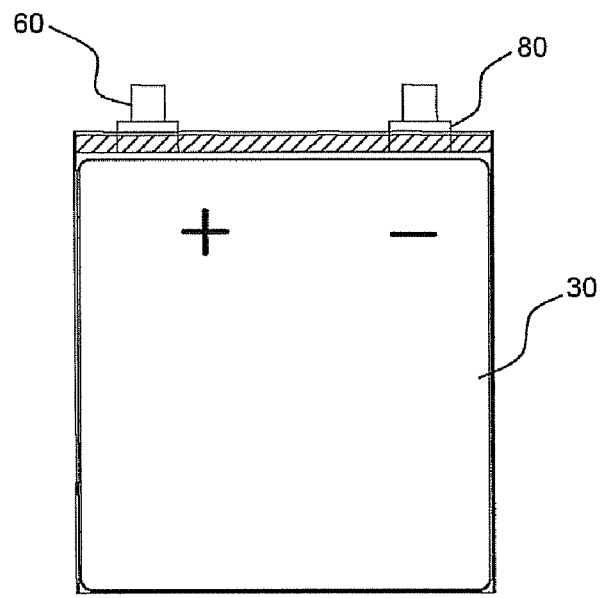
FIG. 3 is a front see-through view illustrating the secondary battery of FIG. 1 in an assembled state.
Figure 4:
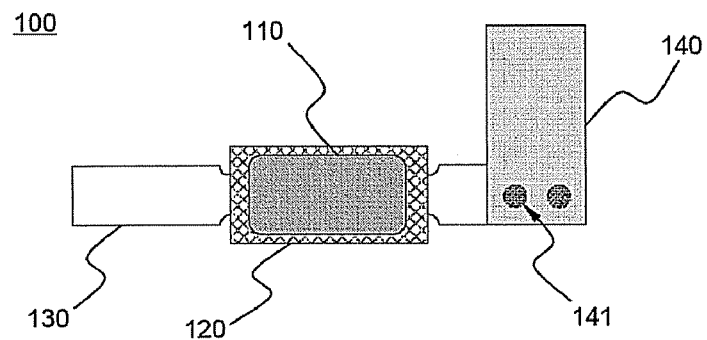
FIG. 4 is a front view illustrating a safety connection member according to a first preferred embodiment of the present invention.

FIG. 4 is a front view typically illustrating a safety connection member 100 according to a first preferred embodiment of the present invention.

Referring to FIG. 4, the safety connection member 100 includes a thermal fuse 110 serving as a safety element, two connection terminals 130 connected to opposite ends of the thermal fuse 110, respectively, and a metal plate 140 coupled to one side surface of one of the connection terminals 130 such that the metal plate 140 is perpendicular to the corresponding connection terminal 130.

The thermal fuse 110 is coated with insulative film 120 to prevent a short circuit between the thermal fuse 110 and a battery cell (not shown) to which the safety connection member 100 will be mounted. The connection terminals 130 are made of nickel. One of the connection terminals 130, which are connected to the opposite ends of the thermal fuse 110, is connected to an electrode terminal of the battery cell, and the other connection terminal 130 is coupled to the metal plate 140, which is perpendicular to the corresponding connection terminal 130. The coupling between the connection terminal 130 and the metal plate 140 is accomplished, for example, by ultrasonic welding or spot welding. The metal plate 140 serves as an external input and output terminal of the battery cell, which will be described in detail below.

Figure 5:
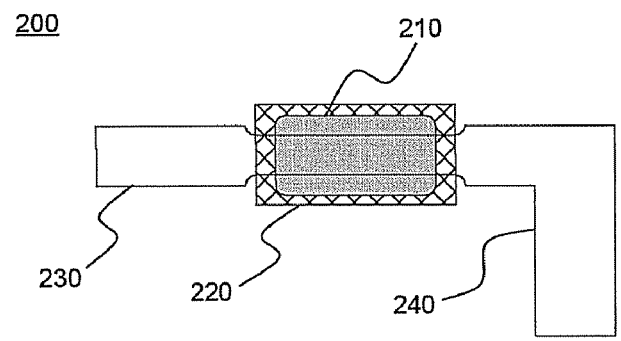
FIG. 5 is a front view illustrating a safety connection member according to a second preferred embodiment of the present invention.

FIG. 5 is a front view typically illustrating a safety connection member 200 according to a second preferred embodiment of the present invention.

Referring to FIG. 5, the safety connection member 200 is constructed in a structure in which connection terminals 230 and 240 are connected to opposite ends of a thermal fuse 210, which is coated with insulative film 220, in the same manner as the safety connection member 100 according to the first preferred embodiment of the present invention. However, one of the connection terminals, i.e., the connection terminal 240, is bent in the shape of "]," and therefore, it is not necessary to couple an additional metal plate to the connection terminal 240.

Figure 6:
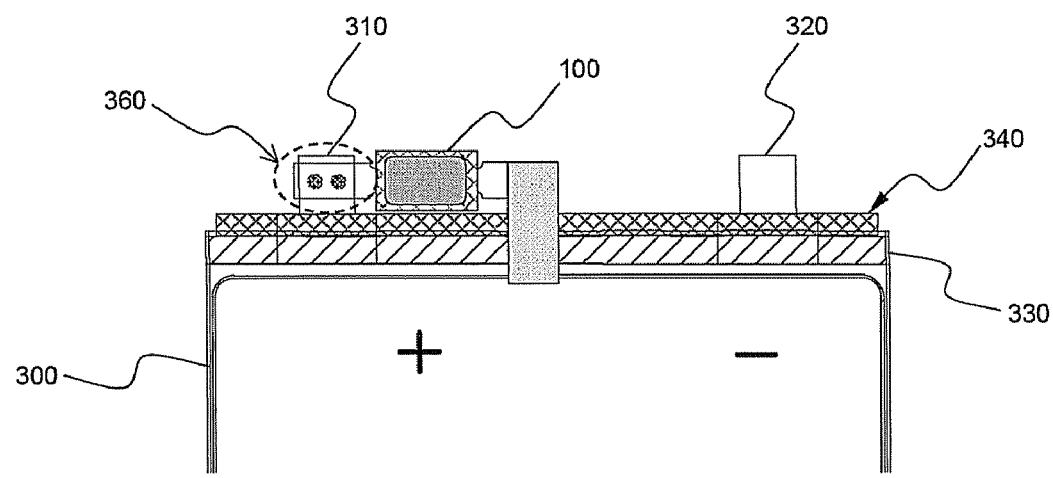
FIGS. 6 to 8 are front views illustrating a process for mounting the safety connection member according to the first preferred embodiment of the present invention to a battery cell.
Figure 7:
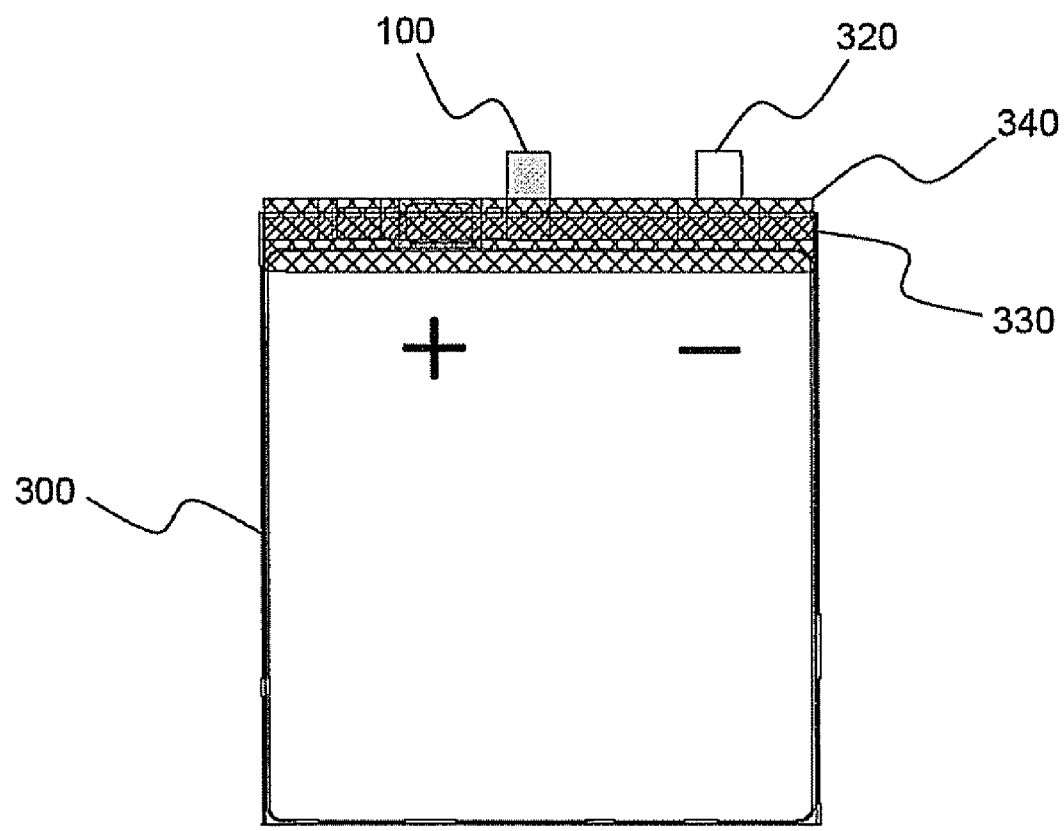
Figure 8:
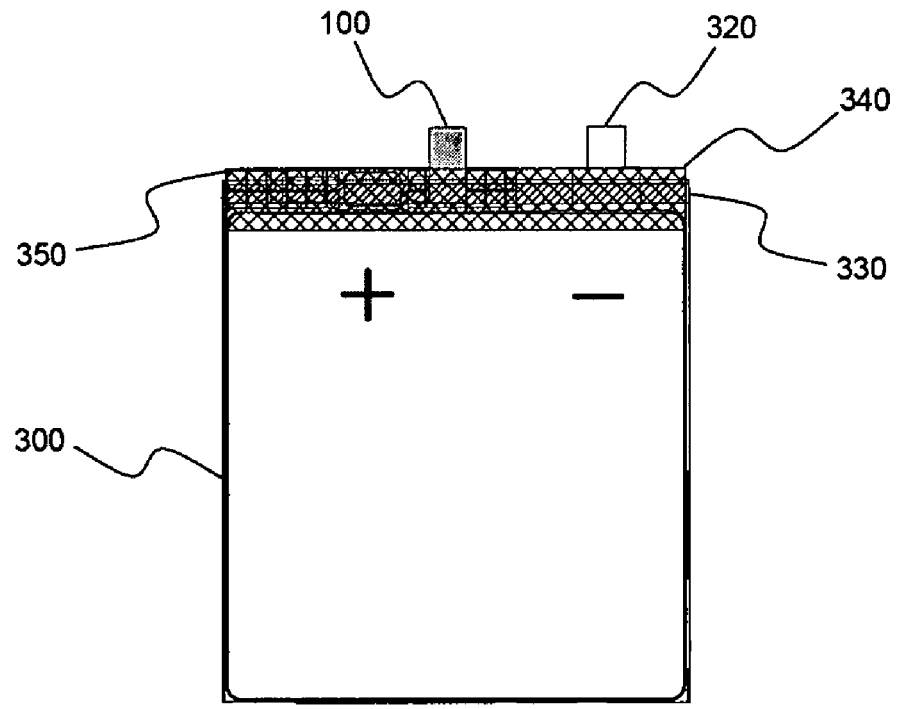
Figure 9:
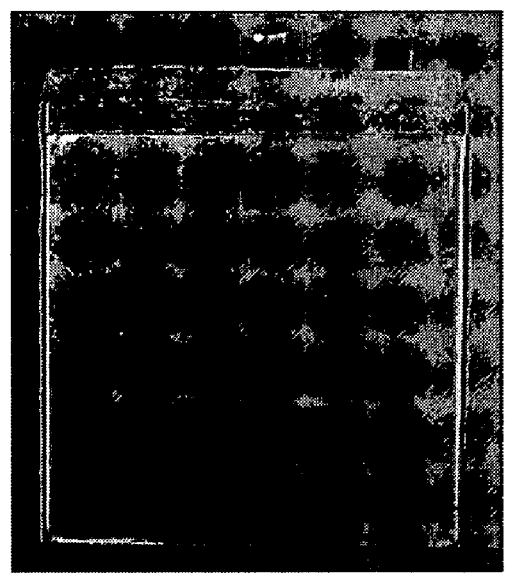
FIG. 9 is a front view illustrating a battery cell to which the safety connection member according to the first preferred embodiment of the present invention is mounted.

FIGS. 6 to 8 are front views illustrating a process for mounting the safety connection member according to the first preferred embodiment of the present invention to a battery cell 300, and FIG. 9 is a front view illustrating a battery cell 300 to which the safety connection member according to the first preferred embodiment of the present invention is mounted.

Referring first to FIG. 6, the safety connection member 100 is coupled to an upper-end sealing part 330 of the battery cell 300 such that the vertical metal plate 140 of the safety connection member 100 is directed toward the lower part of the battery cell 300, and the horizontal connection terminal 130 of the safety connection member 100 is connected to a cathode lead 310 of the battery cell 300. At this time, the connection terminal 130 of the safety connection member 100 is coupled to the cathode lead 310 of the battery cell 300 by ultrasonic welding or spot welding. The joint between the connection terminal 130 of the safety connection member 100 and the cathode lead 310 of the battery cell 300 is indicated by reference numeral 360. Subsequently, insulative tape 340 is attached to the upper-end sealing part 330 of the battery cell so as to increase the coupling force between the safety connection member 100 and the battery cell 300 and to prevent the occurrence of a short circuit between the safety connection member 100 and the battery cell 300. For easy understanding, the insulative tape 340 is partially drawn in FIG. 6; however, the insulative tape 340 may be attached to completely cover the upper-end sealing part 330.

Subsequently, the cathode lead 310 (see FIG. 6) is bent downward such that the safety connection member 100 is rotated 180 degrees, and then the safety connection member 100 is brought into tight contact with the outer surface of an electrode assembly receiving part of the battery cell 300 as shown in FIGS. 7 and 8. The contact region may be covered by insulative tape 350. According to circumstances, the attachment of the insulative tape 340 may not be carried out in the process of FIG. 6, and the attachment of the insulative tape 350 may be carried out only in the process of FIG. 7. Furthermore, as shown in FIG. 8, the attachment of insulative tapes 340 and 350 may be accomplished to cover the upper-end sealing part 300 and a portion of the upper end of the battery cell 300.

The shape of the battery cell to which the safety connection member is mounted according to the present invention is shown in FIG. 9. As can be seen from FIG. 9, the cathode lead of the battery cell is shifted from its original position to a desired position, for example, a middle region of the upper end of the battery cell due to the safety connection member mounted to the battery cell. Also, the high-temperature safety of the battery cell is considerably improved by virtue of the attachment of the safety element.

Figure 10:
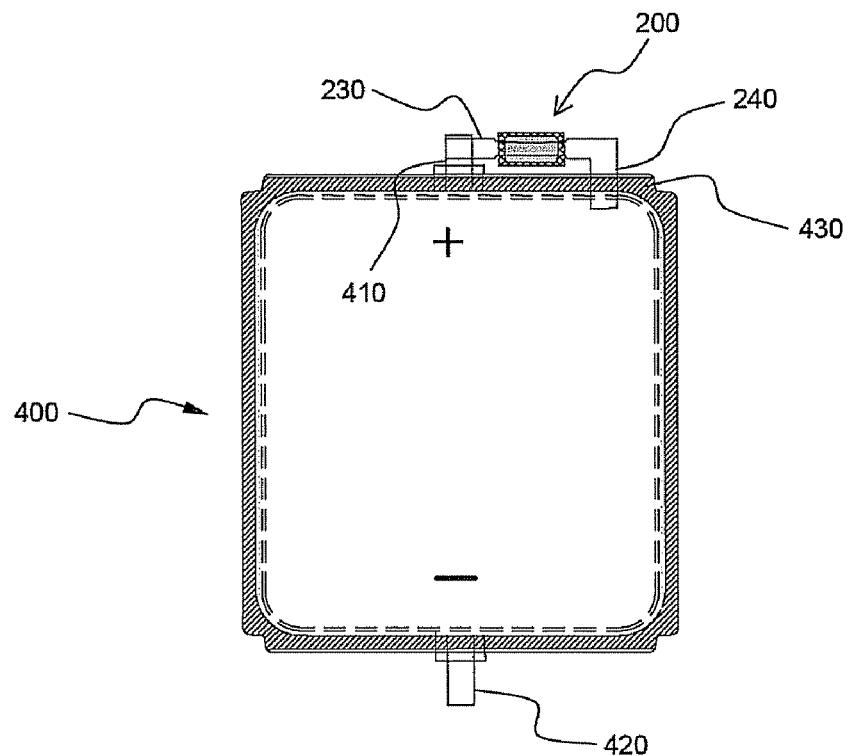
FIGS. 10 to 12 are front views illustrating a process for mounting the safety connection member according to the second preferred embodiment of the present invention to a battery cell.
Figure 11:
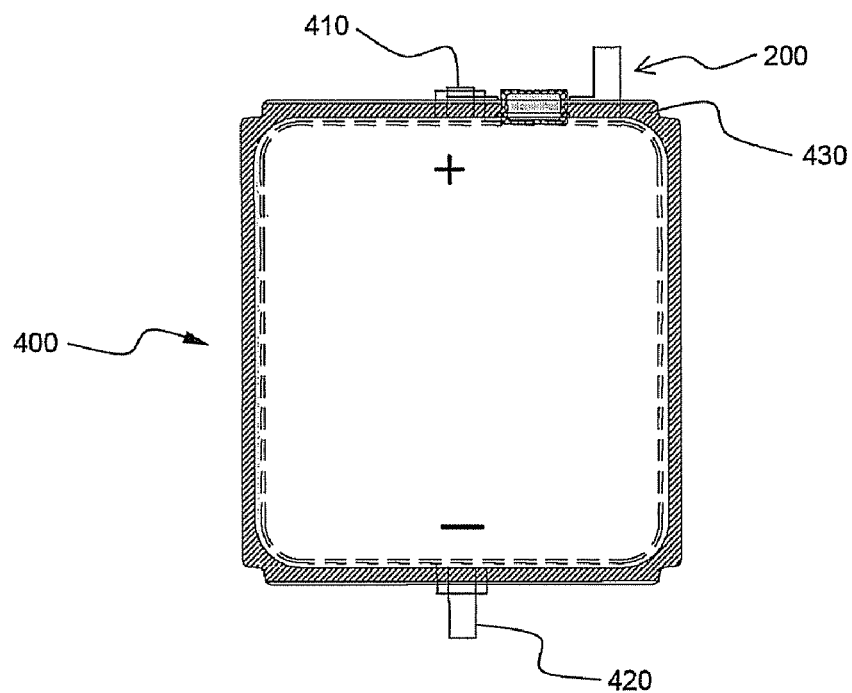
Figure 12:
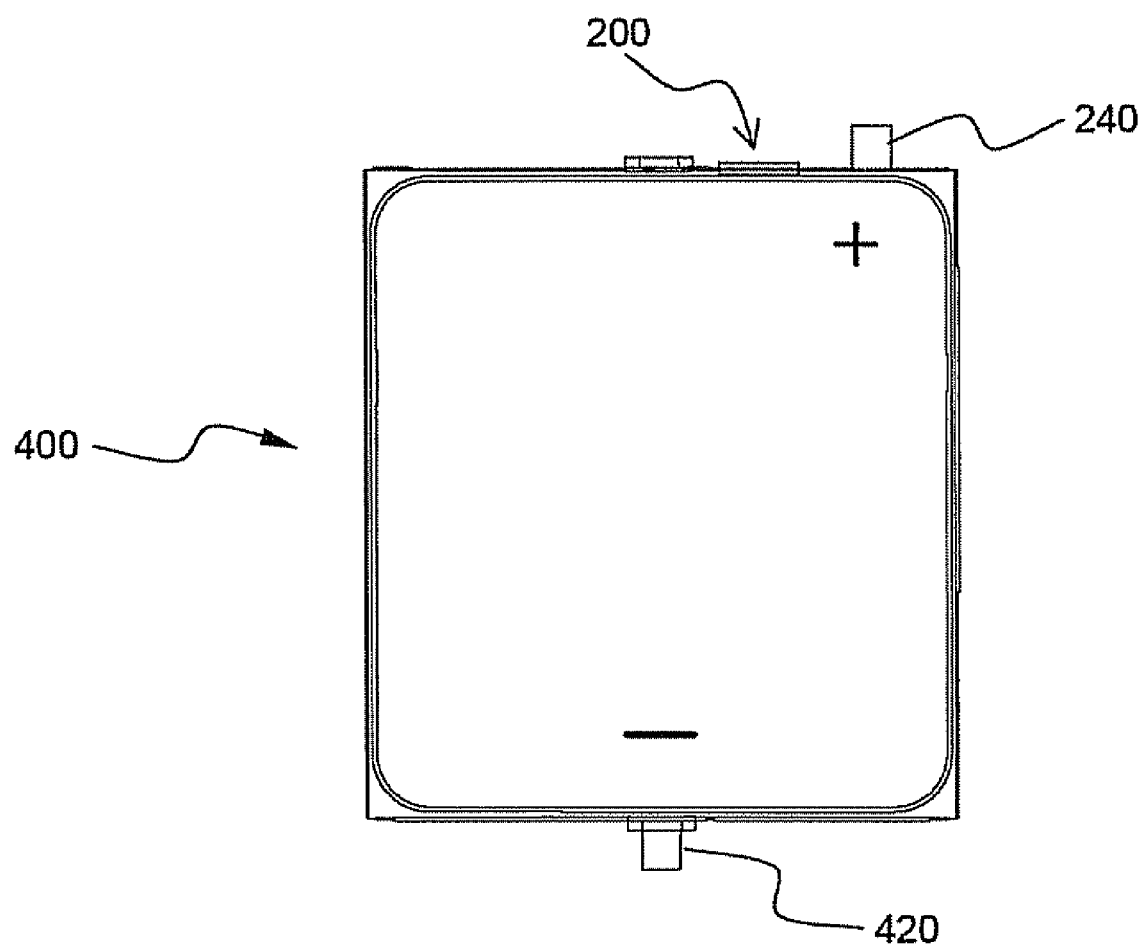

FIGS. 10 to 12 are front views typically illustrating a process for mounting the safety connection member 200 according to the second preferred embodiment of the present invention to a battery cell 400.

Referring first to FIG. 10, there is shown a process for mounting the safety connection member 200 according to the second preferred embodiment of the present invention to the battery cell 400 constructed in a structure in which electrode leads 410 and 420 are located at the upper and lower ends of the battery cell 400.

The safety connection member 200 is coupled to an upper-end sealing part 430 of the battery cell 400 by ultrasonic welding or spot welding such that the vertical connection terminal 240 of the safety connection member 200 is directed toward the lower part of the battery cell 400, and the horizontal connection terminal 230 of the safety connection member 200 is connected to the cathode lead 410 located at the upper end of the battery cell 400.

Subsequently, the cathode lead 410 is bent downward such that the safety connection member 200 is rotated 180 degrees, and then the safety connection member 200 is brought into tight contact with the upper-end sealing part 430 of the battery cell 400 as shown in FIGS. 11 and 12.

Subsequently, sealing regions of the battery case including the upper-end sealing part 430, with which the safety connection member 200 is in contact, are bent perpendicularly to the main surface of the battery case such that the safety connection member 200 is brought into completely tight contact with the outer surface of an electrode assembly receiving part of the battery cell 400.

Finally, the vertical connection terminal 240 of the safety connection member 200 is bent upward with respect to the battery cell 400, and the anode lead 420 located at the lower end of the battery cell 400 is bent downward. The final shape of the battery cell 400 to which the safety connection member 200 is mounted is shown in FIG. 12.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the secondary battery is constructed in a structure in which a specifically-shaped safety connection member, including a PTC element, a bimetal, and a thermal fuse, is mounted to an electrode terminal of a battery cell. Consequently, the position of the corresponding electrode terminal of the battery cell is easily adjusted, and the high-temperature safety of the secondary battery is considerably improved.

What is claimed is:

1. A secondary battery constructed in a structure in which a safety connection member, having a horizontal connection terminal (a) connected to one end of a safety element and a vertical connection terminal (b) connected to the other end of the safety element, is connected to at least one electrode terminal of a battery cell having an electrode assembly of a cathode/separator/anode structure disposed in a battery case in a sealed state, whereby an external input and output terminal of the battery cell is variably formed due to the safety connection member, wherein the horizontal connection terminal (a) of the safety connection member is directly connected to a cathode terminal or an anode terminal of the battery cell such that the horizontal connection terminal (a) is parallel with the lateral direction of the battery cell, whereby the vertical connection terminal (b) of safety connection member electrically and directly connected to an external circuit protrudes in the longitudinal direction of the battery cell;

wherein the battery cell is a battery cell having a pouch-shaped battery case; and wherein (i) the horizontal connection terminal (a) of the safety connection member is connected to an electrode lead (A) of the battery cell such that the vertical connection terminal (b) of the safety connection member is directed toward the lower part of the battery cell, (ii) the electrode lead (A) of the battery cell is bent downward such that the safety connection member is rotated 180 degrees, (iii) sealing parts of the pouch-shaped battery case are bent perpendicularly to the main surface of the battery case such that the sealing parts are brought into tight contact with the outer surface of an electrode assembly receiving part of the battery cell, and (iv) the vertical connection terminal (b) of the safety connection member is bent upward vertically to form the external input and output terminal.

2. The secondary battery according to claim 1, wherein the safety element of the safety connection member is one or more selected from a group consisting of a positive temperature coefficient (PTC) element, a bimetal, and a thermal fuse.

3. The secondary battery according to claim 2, wherein the safety element of the safety connection member is a thermal fuse.

4. The secondary battery according to claim 1, wherein the connection terminals of the safety connection member are metal plates.

5. The secondary battery according to claim 1, wherein the safety connection member is constructed in a structure in which the connection terminals are connected to opposite ends of the safety element, and a metal plate is coupled to one of the connection terminals such that the metal plate is perpendicular to the corresponding connection terminal.

6. The secondary battery according to claim 1, wherein the battery case is a pouch-shaped case made of a laminate sheet including a resin layer and a metal layer.

7. The secondary battery according to claim 1, wherein the electrode assembly is a stacking type or stacking/folding type electrode assembly.

8. The secondary battery according to claim 7, wherein the electrode terminal of the battery cell is formed by connecting a plurality of electrode taps extending from the electrode assembly to an electrode lead.

9. The secondary battery according to claim 1, wherein the safety connection member is connected to a cathode terminal of the battery cell.

10. The secondary battery according to claim 1, wherein the battery cell includes two electrode terminals which are arranged either in the same direction or in the different directions.

11. The secondary battery according to claim 1, wherein the battery is a lithium secondary battery.

12. A medium- or large-sized battery pack having high output and large capacity, the battery pack including the secondary battery according to claim 1 as a unit cell.

* * * * *

UNITED STATES PATENT AND TRADEMARK OFFICE
CERTIFICATE OF CORRECTION

PATENT NO. : 8,216,708 B2  Page 1 of 1
APPLICATION NO. : 11/777659
DATED : July 10, 2012
INVENTOR(S) : Jang et al.

It is certified that error appears in the above-identified patent and that said Letters Patent is hereby corrected as shown below:

In the Specification
Column 1, line 1, "respective" should read --respectively--.
Column 2, line 45, after "is" insert --a--.
Column 4, line 26, "extends" should read --extend--.
Column 4, line 45, "power generating" should read --power-generating--.
Column 5, line 18, "is" should read --are--.
Column 5, line 57, delete "a".

In the Claims
Column 8, line 57, Claim 1, after "of" insert --the--.
Column 10, line 18, Claim 10, "in the different" should read --in different--.

Signed and Sealed this
Twenty-fourth Day of December, 2013

Margaret A. Focarino
*Commissioner for Patents of the United States Patent and Trademark Office*